Patented Nov. 11, 1924.

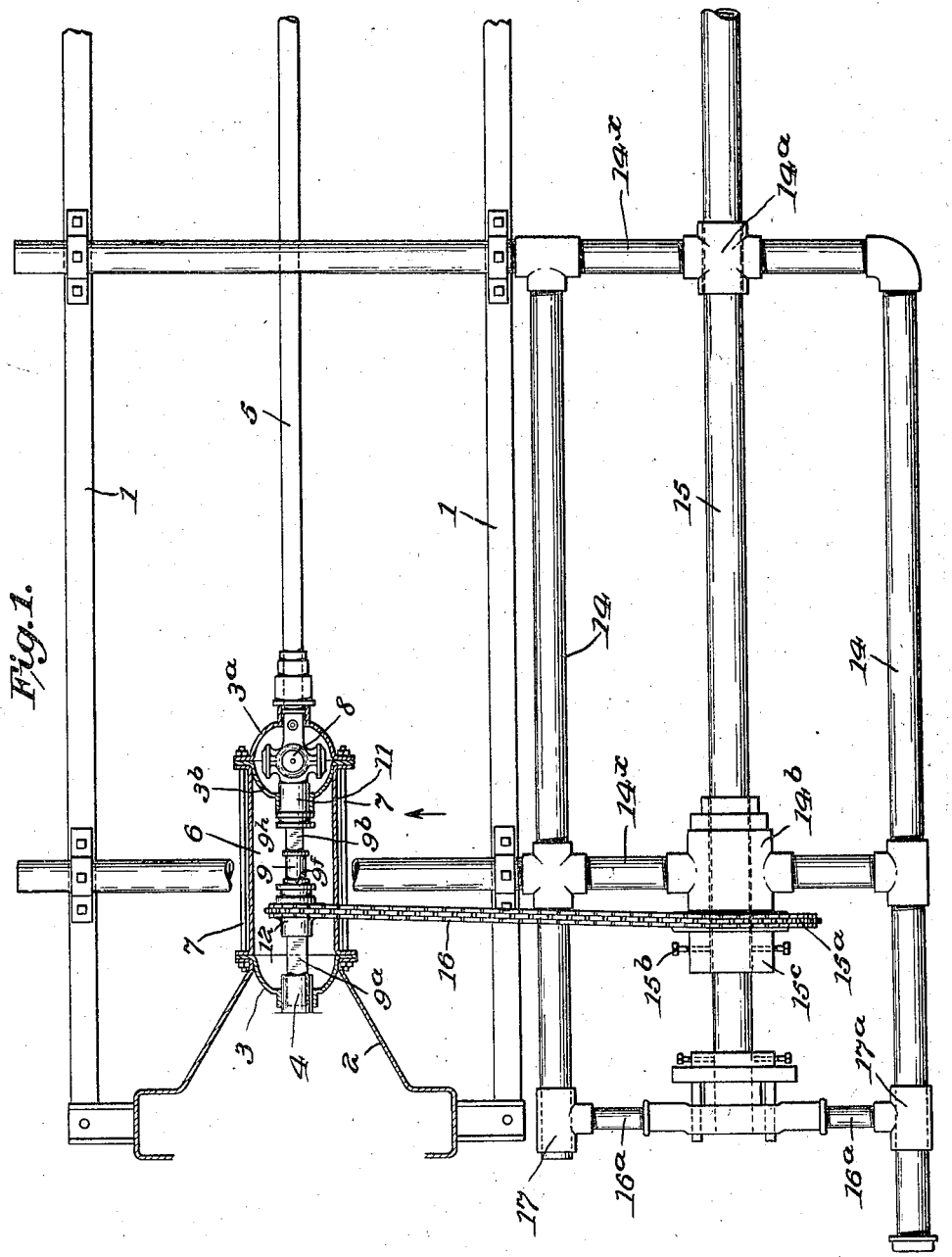

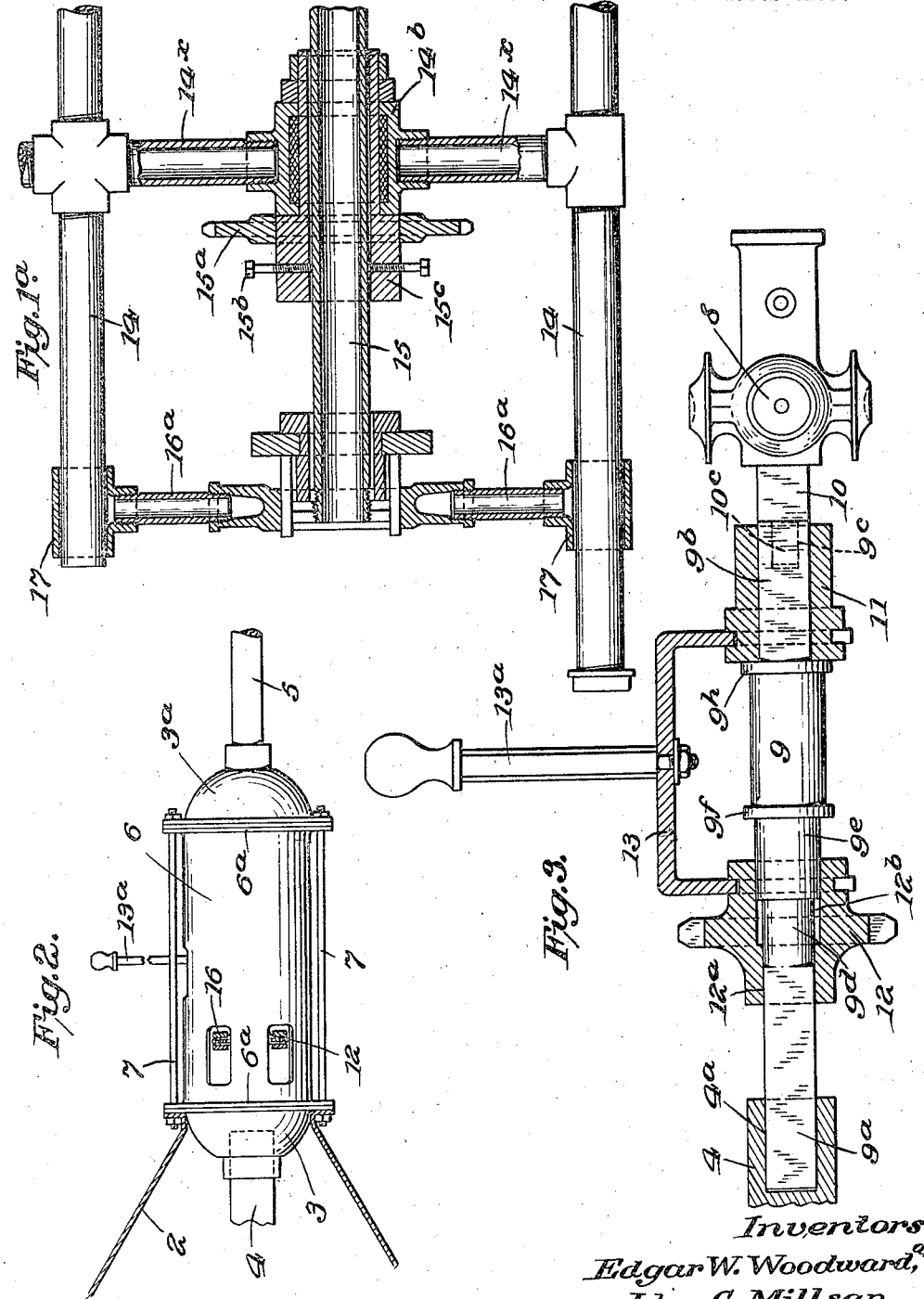

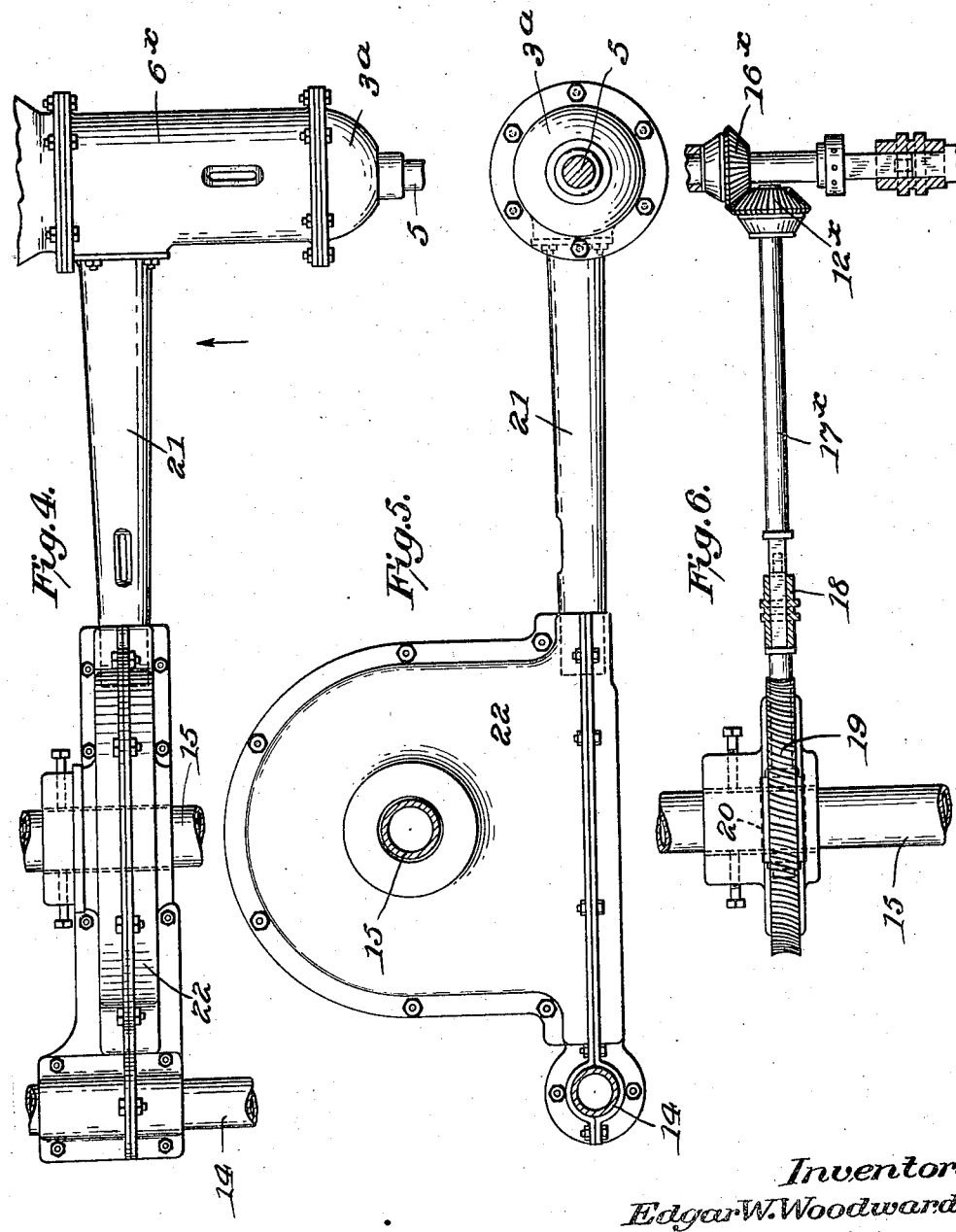

1,515,235

UNITED STATES PATENT OFFICE.

EDGAR W. WOODWARD AND JOHN C. MILLSAP, OF SUSANVILLE, CALIFORNIA.

MOTOR VEHICLE.

Application filed June 14, 1923. Serial No. 645,469.

*To all whom it may concern:*

Be it known that we, EDGAR W. WOODWARD and JOHN C. MILLSAP, citizens of the United States, and residents of Susanville, California, have invented certain new and useful Improvements in Motor Vehicles, of which the following is a specification.

Our present invention relates to improvements in motor vehicles of the type designed to enable the motor to be used as a source of external power, and is designed more especially to provide means by which the car will be especially adapted for the use of plumbers, enabling them to have the power operated means associated with the machine for cutting and threading a pipe, although not limited to this specific use. The invention has also been developed in connection with the Ford motor car, but is not limited to this particular machine.

The invention comprises the novel features of construction and arrangement and combination of parts hereinafter described and particularly defined in the appended claims.

In order that the invention may be more properly understood, we have illustrated the same in the accompanying drawings in which—

Figure 1 is a plan view showing in a conventional manner a sufficient portion of the automobile frame and transmission housing to illustrate the application of our invention. Fig. 1$^a$ is an enlarged sectional detail.

Fig. 2 is a side elevation of the housing as viewed in the direction of the arrow Figure 1.

Fig. 3 is a detail view showing the clutch mechanism,

Fig. 4 is a detail plan view showing a modified form in which a shaft drive is used instead of a chain drive.

Fig. 5 is a side view of the same looking in the direction of the arrow Fig. 4, and Fig. 6 is a view similar to Fig. 4, but with the enclosing housings omitted.

Referring by reference characters to these drawings, the numeral 1 designates the usual frame of the Ford automobile, and 2 the rear part of the transmission housing, which, it will be understood, carries at its rear end the usual semi-spherical member of the universal joint casing which is indicated at 3, the engine shaft which projects into this member 3 being indicated at 4, and being provided with a squared socket 4$^a$ which receives the squared end of the shaft to be driven. 5 designates the usual propeller shaft. In carrying out the present invention, this shaft is shortened or cut off sufficiently to allow the back half of the universal joint housing indicated at 3$^a$ to be moved far enough from the front half or section to provide for the interposition of our improved power transmitting mechanism.

To this end we provide a cylindrical housing 6 having its end adapted to cooperate with the housing members 3, 3$^a$, the ends of the cylindrical housing 6 being provided with flanges 6$^a$ to cooperate with the peripheral flanges of the sections 3 and 3$^a$, the whole being held together by long bolts 7 which take the place of the usual Ford universal housing bolts. It will be understood that the usual universal joint indicated at 8 is provided, secured to the forward end of the propeller shaft 5 shortened as above described, and the rear end of the housing 6 may be provided with an interior auxiliary universal joint housing member 3$^b$ to cooperate with the portion 3$^a$ to form the grease chamber for the universal joint 8.

Within the housing 6 above described, we provide an auxiliary shaft 9 which has a squared portion 9$^a$ fitting the square recess 4$^a$ in the end of the engine shaft. This shaft section 9 has at its rear end a squared portion 9$^b$ which is provided with a cylindrical recess 9$^c$ within which fits the reduced cylindrical end 10$^c$ of the squared shaft portion 10, which latter is connected with or forms a part of the universal joint connection to the propeller shaft. The squared shaft portions 9$^b$ and 10 are of exactly the same size to receive a shifting sleeve 11 which has an opening therethrough of square cross section, corresponding to parts 9$^b$ and 10. Shaft 9 is further provided with round or cylindrical portions 9$^d$ and 9$^e$, the latter being of larger diameter, and co-operating with these is a power transmitting element, in the present instance, a sprocket wheel indicated at 12, which has an opening through the center thereof, one portion of which, 12$^a$, is squared to fit the square portion 9$^a$ and the shaft 9, while the other portion 12$^b$ is cylindrical to fit the cylindrical portion 9$^e$.

The elements 11 and 12 are provided with the customary annular grooves which receive the forks of the double shifting fork member 13 which is provided with a handle member 13ª, projecting up through a slot in the top of the housing 6 into convenient reach of the operator. The shaft 9 is further provided with annular flanges 9ᶠ and 9ʰ which serve as stops to limit the movements of the elements 11 and 12. These parts 11 and 12 are so proportioned in relation to the shaft parts hereinbefore described, that when the clutch fork 13 is moved backward or to the limit of its movement, towards the right Fig. 3, sleeve or clutch member 11 will be moved back over squared portion 10, and by its engagement with square shaft portions 9ᵇ and 10, will couple these together, and cause them to rotate in unison. At the same time power element 12 will have been moved backward or to the right, Fig. 3 until stopped by flange 9ᶠ, at which time the squared portion 12ᵃ of power element 12 will have been disengaged from the square portion 9ᵃ of shaft 9, and will be in alignment with the round portion 9ᵈ of the shaft, whereby the shaft will be free to revolve without rotating the power element 12. In this position the car may be driven in the ordinary manner.

When, however, the clutch operating member 13 is shifted forward or to the left, Fig. 3, the power element 12 will be caused to engage the squared portion 9ᵃ of the shaft, and be rotated thereby, while sleeve or member 11 will be disengaged from the squared portion 10, the limit of movement of member 11 to the left being determined by flange 9ʰ. With the parts in this position, and as shown in Fig. 3, the operation of the engine will drive shaft 9 and power transmitting element 12, without driving the propeller shaft of the automobile.

The power transmitting element 12 may be used for transmitting power for any desired purpose, but as we have had in mind adapting the machine for plumbers' use, we have shown it herein as adapted for operating the pipe threading and cutting means. To this end we have secured to the frame of an automobile an auxiliary frame, preferably formed of tubular or pipe members as shown, and comprising longitudinal members 14 and connecting members 14ˣ, these latter embodying tubular portions 14ᵃ and 14ᵇ through which a pipe may be slid as indicated at 15 Fig. 1. The opening in the member 14ᵇ is made large enough to form a journal for a hollow chuck indicated at 15ᶜ, which chuck carries a sprocket wheel 15ᵃ designed to be driven by sprocket chain 16, from the sprocket wheel 12, this chuck also carrying means of any suitable type as indicated by set screws 15ᵇ which may be screwed in to impinge against the pipe, and lock it to the chuck so that it will be rotated thereby.

Frame members 14 are provided with slidable carriers for a threading die or dies, such carriers being indicated at 17 and 17ᵃ and having the ordinary plumber's stock and die secured thereto by short pipe sections 16ᵃ substituted for the usual handles, so that as the pipe is threaded, the dies will move relative to the pipe, the pipe being held against longitudinal movement by the chuck.

Instead of using a chain and a sprocket drive as shown in the figures above referred to, we may use a bevelled gear and shaft drive as shown in Figs. 4, 5, and 6, in which event we substitute for the sprocket wheel 12 a bevelled gear 12ˣ which meshes with a bevelled gear 16ˣ, fast on one end of a shaft 17ˣ which preferably through the interposition of a clutch member 18 drives a worm 19 which meshes with a worm gear 20, carried by the chuck member. In this construction we preferably provide the shaft 17ˣ with a housing 21 bolted to the housing 6ˣ at one end and to a worm gear housing 22 at the opposite end. The housing 21 is provided with a slot in its upper side to accommodate the shifting fork for operating the clutch member 18, and in this form the worm gear is stopped and started by the clutch 18, bevel gear 12ˣ being fast on the auxiliary shaft.

By the use of the construction hereinbefore described, it will be obvious that the motor car may be driven in the usual manner to the place of work, and then by merely shifting the clutch 13 to connect the power transmitting element 12 with the shaft 9, the apparatus may be used for external power purposes, and it will be obvious that by using either of the forward or reverse drives of the car, the power transmitting element may be rotated in either direction at will.

In the above description where we use the term engine shaft, it will be understood that we do not refer to the crank shaft, but refer to the shaft member which is operated by the transmission mechanism.

Obviously in the form shown in Figs. 1 and 3 the parts are so disposed that when sprocket 12 is clutched to shaft 9 or in driving position, it is aligned with sprocket 15ᵃ, preventing any binding or distortion of the sprocket chain.

Having thus described our invention, what we claim is:

1. In a motor vehicle of the Ford type, the combination with the transmission housing and transmission shaft, of a cylindrical casing secured to said housing and carrying a universal joint housing at its rear end, a propeller shaft having a universal joint in said housing provided with a non-circular shaft section, an auxiliary shaft in said cylindrical housing having its front end connected with said transmission shaft and its rear end non-circular aligned with said non-circular shaft section, a sleeve having a non-circular bore filling said non-circular rear end and slidable to engage said non-circular shaft section, said auxiliary shaft having a power transmission element slidably carried thereby with means for causing it to be locked to the transmission shaft in one position, and released therefrom in another position, and means for shifting said power transmission element and sleeve in unison.

2. In a motor vehicle the combination with the main frame and propeller shaft, of an auxiliary frame secured to said main frame, and projecting from one side thereof, a rotary member journalled in said auxiliary frame on an axis parallel with the propeller shaft, and means for driving said rotary member from the engine.

In testimony whereof, we affix our signatures.

EDGAR W. WOODWARD.
JOHN C. MILLSAP.